United States Patent Office 3,201,445
Patented Aug. 17, 1965

3,201,445
CYCLIC PHOSPHONITRILATE ESTERS OF POLYFLUOROETHER ALCOHOLS
John J. Drysdale, Hockessin, Ronald E. Le Bleu, Wilmington, and John H. Fassnacht, Newark, Del., assignors to E. I. du Pont de Nemours and Company, Wilmington, Del., a corporation of Delaware
No Drawing. Filed May 20, 1963, Ser. No. 281,782
7 Claims. (Cl. 260—461)

This invention relates to certain cyclic phosphonitrilate esters of polyfluoro-ether alcohols and to a process for making them.

Ratz et al., in U.S. Patent 2,876,247, disclose cyclic phosphonitrilates of polyfluoroalkyl alcohols which are indicated to be useful as heat transfer media, high temperature lubricants, and the like. However, those compounds have a narrow liquid range and, such of them as have a sufficiently high molecular weight and the low volatility at 400–500° F. desired for materials to be used as high temperature lubricants and the like, are solids at normal room temperatures (about 25° C.) as shown by their Examples IV–VII, IX and X, whereby they are in general not suitable for most of such purposes.

It is an object of this invention to provide novel cyclic phosphonitrilate esters of polyfluoro-ether alcohols which have improved properties, whereby they are particularly valuable for a variety of purposes. Particularly, it is an objct to provide esters of such class which are stable high boiling liquids, and which are useful as liquid media at high temperatures and are particularly suitable for use as high temperature lubricants. Another object of this invention is to provide a process for preparing said cyclic phosphonitrilate esters of polyfluoro-ether alcohols. Other objects are to provide new compositions of matter and to advance the art. Still other objects will appear hereinafter.

The above and other objects may be accomplished in accord with this invention which provides cyclic phosphonitrilates of the general formula

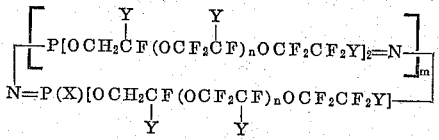

wherein:

(A) X is a member of the group consisting of halogen atoms of atomic number 9 to 35 and

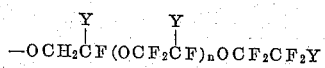

groups,
(B) Y is a member of the group consisting of a fluorine atom and a —$CF_3$ group,
(C) $n$ is an integer of from 1 to 10, and
(D) $m$ is an integer of from 2 to 3.

A further feature of this invention resides in the process for preparing cyclic phosphonitrilate esters of polyfluoroether alcohols which process comprises (A) reacting an alkali metal salt of a polyfluoro-ether alcohol of the formula

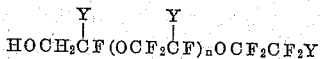

wherein
(a) Y is a member of the group consisting of F and a —$CF_3$ group, and
(b) $n$ is an integer of from 1 to 10, (B) with a cyclic phosphonitrilic dihalide of the formula

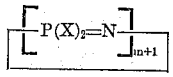

wherein
(a) X is a halogen atom of atomic number 9 to 35, and
(b) $m$ is an integer of from 2 to 3, (C) employing at least one mole of said salt for each atom of halogen in said cyclic phosphonitrilic dihalide,
(D) in an anhydrous, normally liquid inert solvent
(E) at a temperature of from about 25° C. to about 160° C., and
(F) recovering the cyclic phosphonitrilate ester of the polyfluoro-ether alcohol from the reaction mixture.

The cyclic phosphonitrilate esters of the polyfluoroether alcohols of the foregoing defined class are liquids at normal room temperature (about 25° C.) and have high boiling points at atmospheric pressure, including, in some cases, boiling points above 500° C. They are insoluble in water, but are soluble in halogenated organic solvents. They are not flammable and are thermally and oxidatively stable. They are resistant to the action of most chemicals and difficult to hydrolyze, in particular being stable to strong acids and bases. They have particularly valuable lubricating properties whereby they are useful as lubricants, particularly as high temperature lubricants. They are also useful for other purposes where high boiling, thermally stable liquids are required, such as heat transfer media, transformer oils, hydraulic fluids, and the like. They remain liquids at higher molecular weights than related compounds of the prior art, whereby they have lower volatilities and therefore are much more useful as high temperature lubricants and fluids.

The cyclic phosphonitrilate esters are readily prepared by reacting an alkali metal salt of a polyfluoro-ether alcohol of the formula

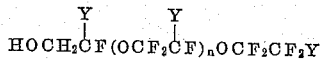

wherein Y is a fluorine atom or a trifluoromethyl group and $n$ is an integer of from 1 to 10, preferably 3 to 4, with a cyclic phosphonitrilic dihalide of the formula

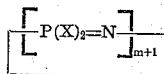

wherein X is a halogen atom of atomic number 9 to 35, i.e., fluorine, chlorine and bromine, and $m$ is an integer of from 2 to 3, i.e., the trimeric and tetrameric phosphonitrilic dihalides, preferably the tetrameric phosphonitrilic dihalides wherein $m$ is 3. The cyclic phosphonitrilic dichlorides (X is chlorine) are readily available commercially and are preferred.

In such process, the alkali metal salt of the polyfluoroether alcohol usually will be employed in a stoichiometric amount, that is, in the proportion of at least 1 mole thereof for each atom of halogen in the cyclic phosphonitrilic dihalide, e.g. at least about 6 moles of salt per mole of trimeric phosphonitrilic dihalide. Usually, it is preferred to employ an excess of the salt, e.g. an excess of about 10% to about 15% by weight.

The reaction is carried out under anhydrous conditions in an inert liquid solvent or media, i.e. the solvent or media should be anhydrous. Suitable solvents or media are excess polyfluoro-ether alcohol, aromatic hydrocarbon solvents such as toluene and xylene, 2,2'-dimethoxydiethyl ether, and the like. When the solvent or media employed is other than excess polyfluoro-ether alcohol, it is preferred to employ a solvent which boils at the desired reaction temperature, e.g. about 110° C. to about 160° C., so that the reaction conveniently can be carried out under reflux. The preferred solvents are xylene and toluene.

The compounds of the general formula

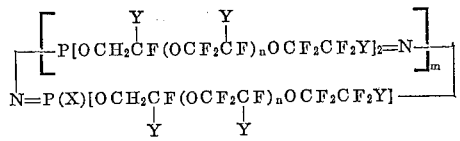

may be considered to encompass 4 subclasses of esters which have the structural Formulas I to IV as shown below:

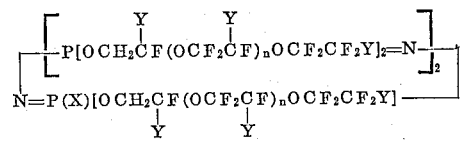

(X=F, Cl or Br)

(I)

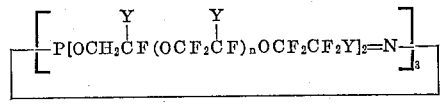

(II)

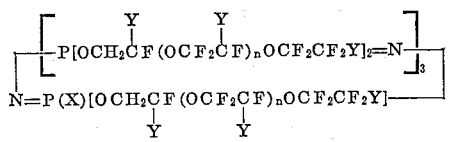

(III)

(X=F, Cl or Br)

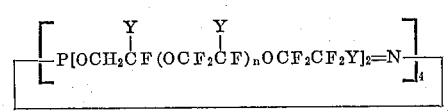

(IV)

The esters of Formulas I and II are produced when a trimeric phosphonitrilic dihalide is used, while products of Formulas III and IV result from the use of a tetrameric phosphonitrilic dihalide. The reaction may be carried out at a temperature in the range of from 25° C. to about 160° C., but preferably is carried out at from about 110° C. to about 160° C. Esters of Formulas I and III are very readily obtained over the broad range of temperatures. In order to replace all the halogen of the phosphonitrilic dihalide and obtain esters of Formulas II and IV, the higher temperatures, about 110° C. to about 160° C., should be used and longer reaction times (usually more than 10 hours) are required than for the production of esters of Formulas I and III. Mixtures of esters of Formulas I and II and of Formulas III and IV can be obtained in desired ratios, particularly at the higher temperatures, by control of the reaction times, and such mixtures form valuable compositions of this invention.

The molecular weight and the boiling points of the esters will vary with the molecular weight of the ether alcohol (the value of $n$) and the number ($m$) of the ether alcohol groups in the esters. Esters, having normal boiling points above 500° C. (at atmospheric pressure), can be obtained by use of the proper combination of reactants and conditions, for example, by use of a tetrameric phosphonitrilic dihalide and ether alcohols wherein $n$ is greater than 5 and by employing reaction temperatures and times which will cause replacement of all of the halogens of the phosphonitrilic dihalide and produce esters of the Formula IV. When a cyclic phosphonitrilate ester of this invention is prepared from the salt of a single polyfluoro-ether alcohol, the value of $n$ will be the same throughout. By employing the salts of a mixture of two or more different polyfluoro-ether alcohols, in which the values of either $n$ or $Y$ or both $n$ and $Y$ are different, there will be obtained mixed esters, containing two or more different polyfluoro-ether alcohol radicals attached to the same cyclic phosphonitrile nucleus, and mixtures of those esters, which mixed esters and mixtures of esters constitute valuable compositions of this invention. Other mixtures of two or more cyclic phosphonitrilate esters of this invention, made by other modifications of the process or by mixing the individual esters, are also contemplated.

The cyclic phosphonitrilate esters of this invention in which $m$ is 3 are preferred, particularly those of the formula

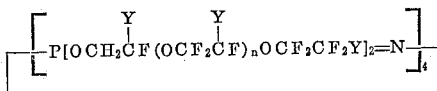

It is further preferred that $Y$ be a trifluoromethyl group, and particularly that $n$ be an integer of 3 to 4. Specially preferred cyclic phosphonitrilate esters of this invention are those of the formula

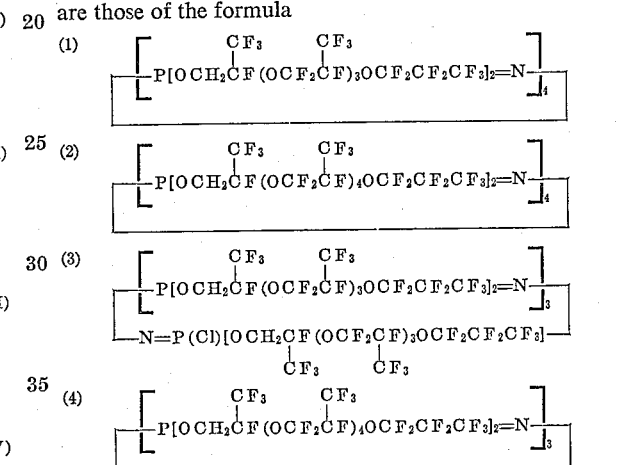

and the equimolar mixture of

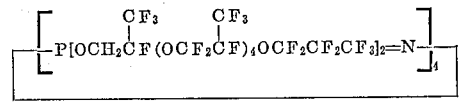

and

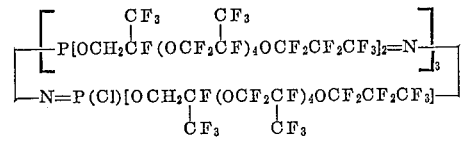

The end of the reaction is easily determined by observing when the by-product alkali metal halide ceases to be formed or when the desired amount thereof has been formed. The esters are recovered from the reaction mixture by distillation or by any other conventional method which permits separation of the esters from the solvents and the other reactants. Generally, it is preferred to fractionally distill or molecularly distill the esters, since trace amounts of by-products can detract from the oxidation and thermal stability of the esters. Frequently, it is desirable to remove the alkali metal halide from the product by filtration or washing with water prior to the distillation.

The alkali metal salts of the polyfluoro-ether alcohols employed in the process of this invention usually will be the lithium, sodium, or potassium salts, preferably the sodium salts. Generally, such salts are prepared by reacting the alcohol with an alkali metal or with an alkali metal hydride in an anhydrous normally liquid inert solvent. Usually, it is preferred to employ the alkali metal hydride, particularly sodium hydride, as the use thereof results in a more readily controlled reaction. When an alkali metal hydride is employed, the solvent may be an excess of the alcohol, a hydrocarbon such as benzene, toluene, xylene, ligroin, and the like, an ether, particularly 2,2'-dimethoxydiethyl ether, dioxane, trichlorotrifluoroethane, or the like. If the alkali metals themselves are employed to prepare the salts of the alcohols, halogenated alkanes such as trichlorotrifluoroethane should not be used as the solvent or reaction media as they tend to react violently with the alkali metals. Otherwise, the same solvents that are used with the alkali metal hydrides may be employed with the alkali metals, although ethers and hydrocarbon solvents are preferred and are far safer. It is important that the reaction be conducted under anhydrous conditions.

The polyfluoro-ether alcohols of the formula

whose alkali metal salts are employed for the production of the esters of this invention, are obtained by the reduction of the corresponding acid fluorides with an alkali metal borohydride ($MBH_4$, wherein M is an alkali metal), preferably sodium borohydride, in an inert solvent in the manner disclosed by Le Bleu and Fassnacht in their copending application Serial No. 247,510, filed December 27, 1962. Preferably, the alcohols are prepared by contacting the acid fluoride with a slight excess of sodium borohydride in dioxane at approximately room temperature. One mole of sodium borohydride per mole of acid fluoride is required. The initial reaction product is a mixture of sodium and boron salts of the polyfluoro-ether alcohols, which salts are cleaved to the free alcohols by cautious treatment thereof with aqueous acid. Such alcohols are purified by distillation or like procedures before they are converted to the alkali metal salts to be used in the present invention.

The acid fluorides, which are used for preparing the polyfluoro-ether alcohols employed in this invention, may be prepared by the polymerization of tetrafluoroethylene oxide,

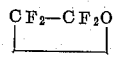

or of hexafluoropropylene oxide,

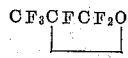

in the presence of a catalyst in the manner disclosed in French Patent 1,275,799 or by the methods disclosed by Le Bleu and Fassnacht in their application Serial No. 247,510, filed December 27, 1962. Usually, the catalyst will be activated carbon or an alkali metal or ammonium fluoride, preferably cesium fluoride. Inert solvents, such as acetonitrile, are used. The value of $n$ is easily controlled, particularly when Y is fluorine and a fluoride catalyst is used, since the products are insoluble in the reaction solvent. In the acid fluorides, obtained by the polymerization of tetrafluoroethylene oxide and in the alcohols obtained thereby, Y will be fluorine. In the acid fluorides, obtained by the polymerization of hexafluoropropylene oxide, and in the alcohols prepared therefrom, Y will be a trifluoromethyl group ($CF_3$). While the processes of French Patent 1,275,799 and of Le Bleu and Fassnacht will produce products in which the value of $n$ may vary from 1 to 50, only those alcohols in which $n$ is in the range of from 1 to 10 are suitable for preparing the phosphonitrilate esters of this invention. The phosphonitrilate esters of the polyfluoro-ether alcohols wherein $n$ is greater than 10, tend to be solids at normal room temperature (25° C.) and hence do not have the desirable properties of the esters of this invention and are not useful for most of the purposes for which the esters of the present invention are particularly valuable, such as lubricants, heat transfer media, transformer oils, hydraulic fluids, and the like.

In the examples given hereinafter, there is disclosed volatility data for cyclic phosphonitrilate esters of polyfluoro-ether alcohols of this invention. Such volatility data was obtained as follows: Aluminum foil dishes, 1½" in diameter and ⅜" deep, were weighed to 0.1 mg., then each was charged with about 1 g. of the test sample and reweighed to 0.1 mg. The charged dishes were then placed on a 3" x 6" copper plate equipped with a thermocouple and resting on a temperature controlled hot plate. The temperature of the copper plate was adjusted to the test temperature, e.g. 400° F., by means of adjusting the hot plate, and the dishes containing the test samples remained on the copper plate for the duration of the test period. The test was carried out in a well ventilated hood to remove any fumes and to provide a circulating atmosphere above the sample surface. At the end of the test period, the dishes were removed, cooled and reweighed as before to determine the sample weight loss.

In order to more clearly illustrate this invention, preferred modes of carrying it into effect, and the advantageous results to be obtained thereby, the following examples are given wherein the parts and proportions are by weight, unless specifically indicated otherwise.

EXAMPLE 1

To a slurry of 233 parts of dry trichlorotrifluoroethane and 7.2 parts (0.3 mole) of sodium hydride were added dropwise, with agitation, 241 parts (0.5 mole) of $CF_3CF_2CF_2OCF(CF_3)CF_2OCF(CF_3)CH_2OH$, B.P. 155° C.–156° C., over a period of one hour. (Care is needed; hydrogen is formed.) When addition was complete, the mixture was stirred under reflux for one hour during which time the solid sodium salt dissolved. The trichlorotrifluoroethane was removed by distillation and replaced by an equal volume of dry toluene. A solution of 17.4 parts (0.05 mole) of trimeric phosphonitrilic dichloride $(PCl_2N)_3$ in 43 parts dry toluene were added dropwise to the stirred slurry of the sodium salt over a period of 30 minutes. The temperature was maintained at about 25° C. After addition was complete, the reaction mixture was heated under reflux for four hours with rapid agitation. The reaction mixture was then cooled and the sodium chloride was removed by filtration. The solvent was removed from the filtrate by distillation and the residual product was fractionally distilled at reduced pressure, giving 74 parts (57% yield based on phosphonitrilic dichloride used) of product, B.P. 190° C.–196° C./0.1 mm., M.P. –57° C. The product had the structure

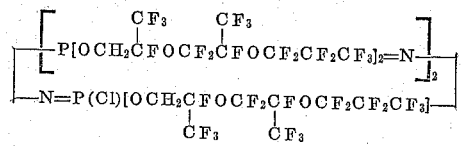

as shown by the following analysis.

Calcd. for $C_{45}H_{10}F_{85}N_3O_{15}P_3Cl$: C, 21.0; H, 0.2; F, 62.7; P, 3.6; Cl, 1.4.

Found: C, 21.1; H, 0.3; F, 61.7; P, 3.6; Cl, 1.1.

This product had the following properties:

| | |
|---|---|
| Viscosity, 100° F., centistokes | 36.29 |
| Viscosity, 210° F., centistokes | 5.23 |
| Viscosity index (ASTM–D–567) | 74 |
| ASTM slope (100° F.–210° F.) | 0.790 |
| Pour point, ° F. | –70 |
| Volatility: | |
| ½ hr. at 400° F., percent | 19 |
| 2 hrs. at 400° F., percent | 51 |

EXAMPLE 2

Using a procedure similar to that described in Example 1, 157 parts (0.28 mole) of

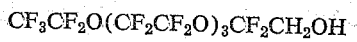

were caused to react with 4.1 parts (0.17 mole) of sodium hydride and the resulting sodium salt was reacted with 9.7 parts (0.028 mole) of trimeric phosphonitrilic dichloride, giving 52.5 parts (63% yield) of product, B.P. 205° C.–223° C./0.6 mm., M.P. —65° C. The product has the structure

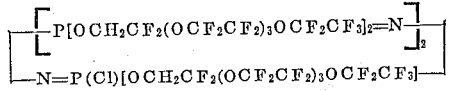

as shown by the following analysis.

Calcd. for $C_{50}H_{10}F_{95}N_3O_{25}P_3Cl$: C, 20.1; H, 0.1; F, 60.3; P, 3.1; Cl, 1.2.
Found: C, 20.2; H, 0.2; F, 59.6; P, 3.1; Cl, 1.0.

This product had the following characteristics.

| | |
|---|---|
| Viscosity, 100° F., centistokes | 15.09 |
| Viscosity, 210° F., centistokes | 3.37 |
| Viscosity index (ASTM–D–567) | 106 |
| ASTM slope (100° F.–210° F.) | 0.763 |
| Pour point, ° F. | —85 |
| Volatility: | |
| ½ hr. at 400° F., percent | 7 |
| 2 hrs. at 400° F., percent | 13 |

EXAMPLE 3

The sodium salt of $$CF_3CF_2O(CF_2CF_2O)_{5.7\ ave.}CF_2CH_2OH$$

B.P. 54° C.–108° C./0.5 mm., was prepared by the reaction of 124.5 parts (0.14 mole) of the alcohol with 2.4 parts (0.1 mole) of sodium hydride in 143 parts dry ether. The ether was replaced with an equal volume of dry dimethyl ether of diethylene glycol. Then 5.8 parts (0.0125 mole) of tetrameric phosphonitrilic dichloride $(PCl_2N)_4$ was added slowly at 25° C. The reaction mixture was then heated under reflux for 6 hours with agitation. After cooling, filtering and removing the solvent by distillation, the product was purified by distilling in a molecular still at 292° C. at 0.5 micron pressure, giving 30.4 parts (34% yield) of product having the following structure as shown by the analysis below.

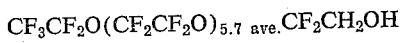

Calcd. for $C_{123}H_{16}F_{238}N_4P_4O_{62}$: C, 20.5; H, 0.2; F, 62.9; P, 1.7; Cl, 0.
Found: C, 21.1; H, 0.2; F, 60.9; P, 1.7; Cl, <0.1.

This product had the following characteristics.

| | |
|---|---|
| Viscosity, 100° F, centistokes | 30.81 |
| Viscosity, 210° F., centistokes | 6.21 |
| Viscosity index (ASTM–D–567) | 151 |
| ASTM slope (100° F.–210° F.) | 0.647 |
| Pour point, ° F. | —55 |
| Volatility: | |
| 2 hrs. at 400° F., percent | 14 |
| ½ hr. at 500° F., percent | 17 |
| 2 hrs. at 500° F., percent | 25 |

EXAMPLE 4

Using the procedure of Example 3, 100 parts (0.11 mole) of $CF_3CF_2O(CF_2CF_2O)_6CF_2CH_2OH$, B.P. 108° C–110° C./6.0–0.5 mm., was caused to react with 2.16 parts (0.09 mole) of sodium hydride in 107 parts of ether. The resulting sodium salt was caused to react with 5.22 parts of trimeric phosphonitrilic dichloride (0.015 mole) in 130 parts of toluene. After heating under reflux for 8 hours, cooling, filtering and removing the solvent by distillation, the product was found to be an equimolar mixture of

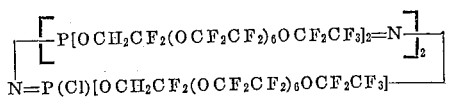

and

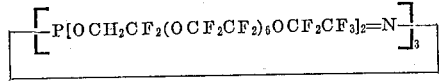

as shown by the following analysis.

Calcd for $C_{88}H_{11}F_{170.5}N_3O_{44}P_3Cl_{0.5}$: C, 20.4; H, 0.2; F, 62.6; P, 1.8; Cl, 0.3.
Found: C, 20.4; H, <0.1; F, 62.9; P, 1.8; Cl, 0.6.

This product had the following characteristics.

| | |
|---|---|
| Viscosity, 100° F., centistokes | 25.70 |
| Viscosity, 210° F., centistokes | 5.85 |
| Viscosity index (ASTM–D–567) | 165 |
| ASTM slope (100° F.–210° F.) | 0.620 |
| Pour point, ° F. | 0 |
| Volatility: | |
| ½ hr. at 500° F., percent | 8 |
| 2 hrs. at 500° F., percent | 22 |

EXAMPLE 5

To a slurry of 1.56 parts of sodium hydride in dry ether was added slowly 97 parts (0.0915 mole) of $CF_3CF_2O(CF_2CF_2O)_7CF_2CH_2OH$ (B.P. 123° C.–145° C./0.8 mm). After addition, the solution was stirred for 22½ hours. The ether was replaced with 86.4 parts of dry xylene and a solution of 3.76 parts (0.0081 mole) of tetrameric phosphonitrilic dichloride in 86.4 parts xylene was added to the slurry. The resulting mixture was heated under reflux for 96 hours with agitation. After cooling, filtering and removing the solvent by distillation, 47 parts of product (69% yield) were obtained having the structure

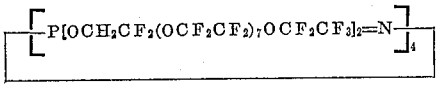

as indicated by the following analysis.

Calcd. for $C_{144}H_{16}F_{280}N_4O_{72}P_4$: C, 20.6; H, 0.2; F, 63.4; P, 1.5; Cl, 0.00.
Found: C, 20.8; H, 0.2; F, 62.3; P, 1.3; Cl, 0.2.

This product had the following characteristics.

| | |
|---|---|
| Viscosity, 100° F., centistokes | 44.59 |
| Viscosity, 210° F., centistokes | 9.09 |
| Viscosity index (ASTM–D–567) | 145 |
| ASTM slope (100° F.–210° F.) | 0.571 |
| Pour point, ° F. | 20 |
| Volatility: | |
| ½ hr. at 500° F., percent | 5 |
| 2 hrs. at 500° F., percent | 24 |
| 4 hrs. at 500° F., percent | 32 |

EXAMPLE 6

In the same manner as Example 5, the product

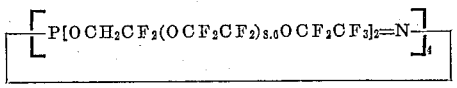

was prepared in 27% yield and purified through a molecular still at 360 C.–370° C./less than 1 micron pressure.

Analysis calcd. for $C_{170}H_{16}F_{331}O_{85}N_4P_4$: C, 20.6; H, 0.2; F, 63.6; P, 1.3; Cl, 0.0.
Found: C, 21.0; H, <0.1; F, 61.7; P, 1.1; Cl, <0.05.

This product had the following characteristics.

Viscosity, 100° F., centistokes _____ 60.79
Viscosity, 210° F., centistokes _____ 11.91
Viscosity index (ASTM-D-567) _____ 152
ASTM slope (100° F.-210° F.) _____ 0.576
Pour point, ° F. _____ 25
Volatility:
   ½ hr. at 500° F., percent _____ 6
   2 hrs. at 500° F., percent _____ 29
   4 hrs. at 500° F., percent _____ 32

EXAMPLE 7

Other products, which were prepared in the same manner as in the preceding examples and having the following properties, are shown below.

(A) 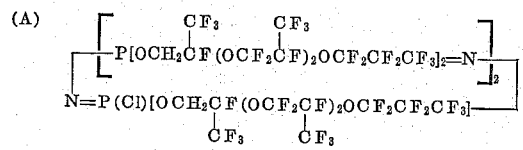

Viscosity, 100° F., centistokes _____ 56.1
Viscosity, 210° F., centistokes _____ 7.0
Viscosity index (ASTM-D-567) _____ 87
ASTM slope (100° F.-210° F.) _____ 0.759
Pour point, ° F. _____ -20
Volatility:
   2 hrs. at 400° F., percent _____ 12
   ½ hr. at 500° F., percent _____ 42
   2 hrs. at 500° F., percent _____ 91

(B) 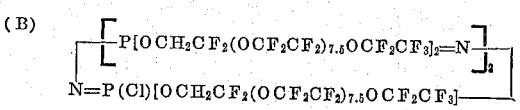

Viscosity, 100° F., centistokes _____ 24.99
Viscosity, 210° F., centistokes _____ 5.44
Viscosity index (ASTM-D-567) _____ 159
ASTM slope (100° F.-210° F.) _____ 0.650
Pour point, ° F. _____ 5
Volatility:
   ½ hr. at 400° F., percent _____ 19
   2 hrs. at 400° F., percent _____ 26
   ½ hr. at 500° F., percent _____ 28
   2 hrs. at 500° F., percent _____ 48

(C) 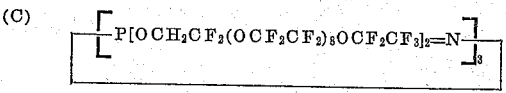

Viscosity, 100° F., centistokes _____ 32.45
Viscosity, 210° F., centistokes _____ 6.75
Viscosity index (ASTM-D-567) _____ 156
ASTM slope (100° F.-210° F.) _____ 0.629
Pour point, ° F. _____ 10
Volatility:
   ½ hr. at 400° F., percent _____ 5
   2 hrs. at 400° F., percent _____ 12
   ½ hr. at 500° F., percent _____ 14
   2 hrs. at 500° F., percent _____ 34

(D) 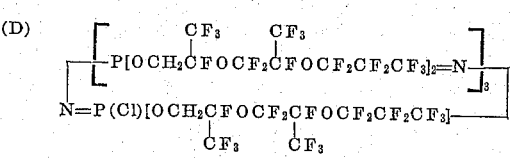

Viscosity, 100° F., centistokes _____ 85.8
Viscosity, 210 F., centistokes _____ 10.83
Viscosity index (ASTM-D-567) _____ 117
ASTM slope (100° F.-210° F.) _____ 0.666
Pour point, ° F. _____ -30

Volatility:
   2 hrs. at 400° F., percent _____ 8
   ½ hr. at 500° F., percent _____ 39
   2 hrs. at 500° F., percent _____ 100

(E) 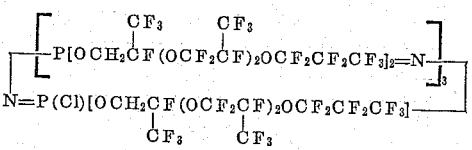

Viscosity, 100° F., centistokes _____ 84.6
Viscosity, 210° F., centistokes _____ 10.43
Viscosity index (ASTM-D-567) _____ 113
ASTM slope (100° F.-210° F.) _____ 0.679
Pour point, ° F. _____ -60
Volatility:
   ½ hr. at 400° F., percent _____ 3
   2 hrs. at 400° F., percent _____ 4
   ½ hr. at 500° F., percent _____ 11
   2 hrs. at 500° F., percent _____ 39

(F) 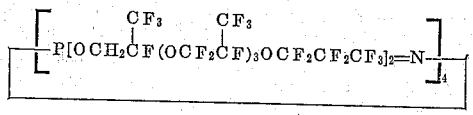

Viscosity, 100° F., centistokes _____ 136.2
Viscosity, 210° F., centistokes _____ 15.89
Viscosity index (ASTM-D-567) _____ 120
ASTM slope (100° F.-210° F.) _____ 0.624
Pour point, ° F. _____ -30
Volatility
   ½ hr. at 500° F., percent _____ 0.9
   2 hrs. at 500° F., percent _____ 1.6

An equimolar mixture of (G) 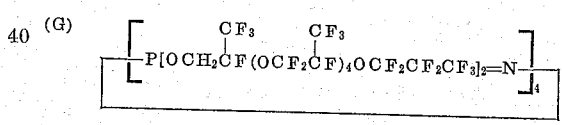

and

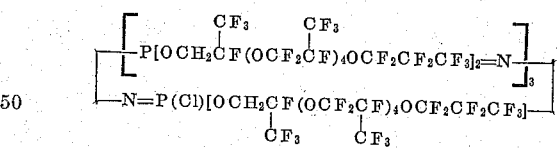

Viscosity, 100° F., centistokes _____ 168.2
Viscosity, 210° F., centistokes _____ 17.96
Viscosity index (ASTM-D-567) _____ 118
ASTM slope (100° F.-210° F.) _____ 0.619
Pour point, ° F. _____ -15
Volatility:
   ½ hr. at 500° F., percent _____ 0.76
   2 hrs. at 500° F., percent _____ 1.34

EXAMPLE 8

The product of Example 1 was subjected to the oxidation stability test. In this test, 10-15 ml. of test sample and a freshly cleaned strip of copper are placed in a glass reaction cell equipped with a glass reflux condenser. The cell and contents are then immersed in an oil bath thermostatically maintained at 500° F. A continuous flow of dry air at 25 ml./min. is passed through the test sample for 24 hours. At the end of this time, the cell and contents are cooled and the changes in viscosity and the weight loss of the copper are determined. The results are shown below.

24 hrs., 500° F. oxidation test

| Product | Percent Change in Viscosity | | Weight Loss of Copper, mg./cm.$^2$ |
|---|---|---|---|
| | 100° F. | 210° F. | |
| Example 1 | 2 | 1 | 0.67 |

It will be understood that the preceding examples have been given for illustrative purposes solely and that this invention is not restricted to the specific embodiments described therein. On the other hand, it will be readily apparent to those skilled in the art that, subject to the limitations set forth in the general description, many variations can be made in the esters of this invention and in the materials, proportions, and conditions employed without departing from the spirit or scope of this invention.

From the foregoing description, it will be apparent that this invention provides a novel class of cyclic phosphonitrilate esters of polyfluoro-ether alcohols which are normally liquid, high boiling, materials having a combination of valuable properties which render them highly useful and valuable as high temperature lubricants and for a variety of other useful purposes. Also, this invention provides a process for preparing such esters. Therefore, it will be apparent that this invention constitutes a valuable contribution to and advance in the art.

The embodiments of this invention in which an exclusive property or privilege is claimed are defined as follows:

1. A cyclic phosphonitrilate of the formula

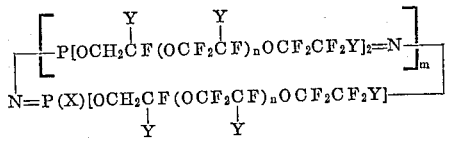

wherein:
(A) X is a member of the group consisting of halogen atoms of atomic number 9 to 35 and

groups,
(B) Y is a member of the group consisting of a fluorine atom and a —CF$_3$ group,
(C) n is an integer of from 1 to 10, and
(D) m is an integer of from 2 to 3.

2. A cyclic phosphonitrilate of the formula

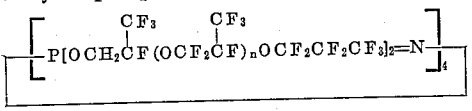

wherein n is an integer of from 1 to 10.

3. A cyclic phosphonitrilate of the formula

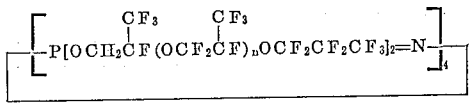

wherein n is an integer of from 3 to 4.

4. A cyclic phosphonitrilate of the formula

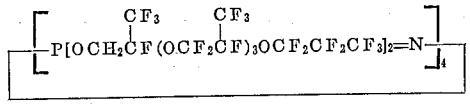

5. An equimolar mixture of cyclic phosphonitrilates of the formula (1)

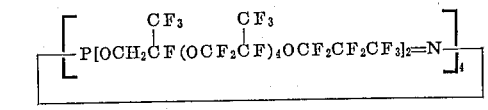

and (2)

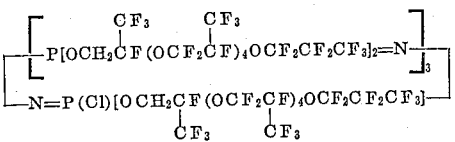

6. A cyclic phosphonitrilate of the formula

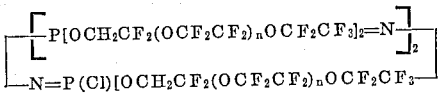

wherein n is an integer of from 1 to 10.

7. A cyclic phosphonitrilate of the formula

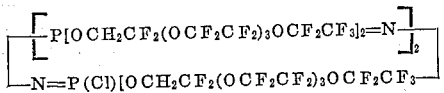

References Cited by the Examiner
UNITED STATES PATENTS

| 2,876,247 | 3/59 | Ratz et al. | 250—461 |
| 2,876,248 | 3/59 | Ratz et al. | 260—461 |
| 3,074,989 | 1/63 | Ratz et al. | 260—461 |

CHARLES B. PARKER, *Primary Examiner*.

IRVING MARCUS, *Examiner*.